United States Patent
Solovey et al.

(10) Patent No.: US 8,635,586 B1
(45) Date of Patent: Jan. 21, 2014

(54) METHOD AND SYSTEM FOR PROVIDING SERVICES IN MODELED COMPONENTS

(75) Inventors: Edward Solovey, Brookline, MA (US); Basil C. Hosmer, Winchester, MA (US)

(73) Assignee: Adobe Systems Incorporated, San Jose, CA (US)

( * ) Notice: Subject to any disclaimer, the term of this patent is extended or adjusted under 35 U.S.C. 154(b) by 703 days.

(21) Appl. No.: 12/573,339

(22) Filed: Oct. 5, 2009

(51) Int. Cl.
*G06F 9/44* (2006.01)
*G06F 3/00* (2006.01)

(52) U.S. Cl.
USPC .......................................... 717/104; 715/758

(58) Field of Classification Search
USPC .......................................................... 717/104
See application file for complete search history.

(56) References Cited

U.S. PATENT DOCUMENTS

2009/0158240 A1* 6/2009 Zhang et al. .................. 717/104

OTHER PUBLICATIONS

"Adobe LiveCycle Data Services ES Developer's Guide", [Online]. Retreived from the Internet: <URL: http://help.adobe.com/en_US/livecycle/es/lcds_dev_guide.pdf>, (2007), 626 pgs.

* cited by examiner

*Primary Examiner* — Hyun Nam
(74) *Attorney, Agent, or Firm* — Schwegman, Lundberg & Woessner, P.A.

(57) ABSTRACT

A system for providing one or more services in modeled components is described. An example system comprises a request detector, an entity component, and a service component. The request detector may be configured to receive requests to create modeled components. The entity builder may be configured to create entities associated with models. The services designer may be configured to create service components. A service component includes one or more functions that can be called from a property of an entity in the modeled component.

20 Claims, 5 Drawing Sheets

METHOD AND SYSTEM FOR PROVIDING SERVICES IN MODELED COMPONENTS

TECHNICAL FIELD

This disclosure relates generally to the technical fields of software and/or hardware technology and, in one example embodiment, to system and method for providing one or more services in modeled components.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In software engineering, a model comprises an abstract description of the software component(s) used by a software system of one or more applications, processes, or other functional units. A model can be defined using a modeling language that typically comprises a consistent set of rules used to interpret the syntax used to express the model. The model can formally define the structure and meaning of data.

Various modeling languages exist that allow for modeling of data and processes of an application. For example, Unified Modeling Language (UML) provides a graphical language for modeling various aspects of a software system. Code generation based on models, such as UML, can allow a skeleton or framework of source code to be produced based on model specifications. For example, the "employee model" may be used to generate the "Employee" class noted above or another logical expression of the employee component.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A suite of technologies that enables model-driven development of computing applications may include a data modeling language, tools for working with data models and associated code-generation, and runtime environment for the modeling language. An example data modeling language is an XML-based language that allows developers to define entities, associations between entities, and behaviors of entities. XML is the abbreviation for Extensible Markup Language. A modeling editor may be configured for creating and manipulating data models, as well as for deploying data models to a data services server, and may be termed a modeler module (or modeler). A data model, in one embodiment, may define one or more entities, where each entity represents a custom data type. An entity comprises one or more data properties that may correspond to persistent storage or may define expressions. An example of an entity representing an applicant component is shown below in Table 1.

TABLE 1

```
<entity name="Applicant">
    <property name="name" type="string"/>
    <property name="ssn" type="string"/>
    <property name="age" type="integer"/>
    <property name="score" expr="CreditScore.getCreditScore(ssn)/>
</entity>
```

Entities represent custom data types and are made up of data properties and derived properties. Data properties correspond to persistent storage, while derived properties are not backed by persistent storage and thus enable behavior customization in expressions over data properties and function calls. You can use variants to make parts of the structure conditional on the state of other parts of the structure. An example of a derived property that defines a named expression is the "score" property shown in Table 1 above. A derived property may reference other data or derived properties, built-in functions, and functions that are declared as part of so-called service components.

Service components (or simply services) to be provided in a model may be supported by a modeling language and may enable modelers to group one or more functions together into a service. A service may be described as a collection of one or more strongly typed function definitions that permits associating a property of an entity in a model with one or more of the functions from the service component. A function in a service component may declare zero or more input parameters and an output parameter. The parameter types may be entities defined in the same model that includes the definition of the service component.

As mentioned above, models may be created and manipulated utilizing a modeler module (or a modeler). A modeler, in one example embodiment, may include a services designer module for defining and utilizing service components (also referred to as merely services) and make one or more services available within a model. The association between a property of an entity and a service may be expressed by referencing a function from the service component in an expression attribute of a property element.

An example of a model that defines a service component with a function that is referenced in an entity of the model entity of the model is shown below in Table 2.

TABLE 2

```
<model xmlns="http://ns.adobe.com/Fiber/0.3">
  <service name="CreditScore">
    <function name="getCreditScore" arguments="ssn:string" return-type="integer"/>
    <function name="getRisk" arguments="state:string, age:integer, score:integer" return-type="integer"/>
  </service>
  <entity name="Applicant">
    <property name="name" type="string"/>
    <property name="ssn" type="string"/>
    <property name="age" type="integer"/>
    <property name="state" type="string"/>
    <property name="score" expr="CreditScore.getCreditScore(ssn)"/>
    <property name="risk" expr="CreditScore.getRisk(state, age, score)"/>
  </entity>
</model>
```

As shown in Table 2, a service named "CreditScore" is defined in the model with two functions called "getCreditScore" and "getRisk." The function "getCreditScore," for example, takes a string as an input argument and returns an integer as output. In the entity "Applicant," a derived property called "score" receives a value based on the result of the function "getCreditScore" invoked with the applicant's social security number "ssn" as the invocation parameter. The type of the "score" property is the same as the type of the return parameter of the "getCreditScore" function. At runtime, the "getCreditScore" function is executed and the runtime value of the "credit" property is populated.

Figure 1:
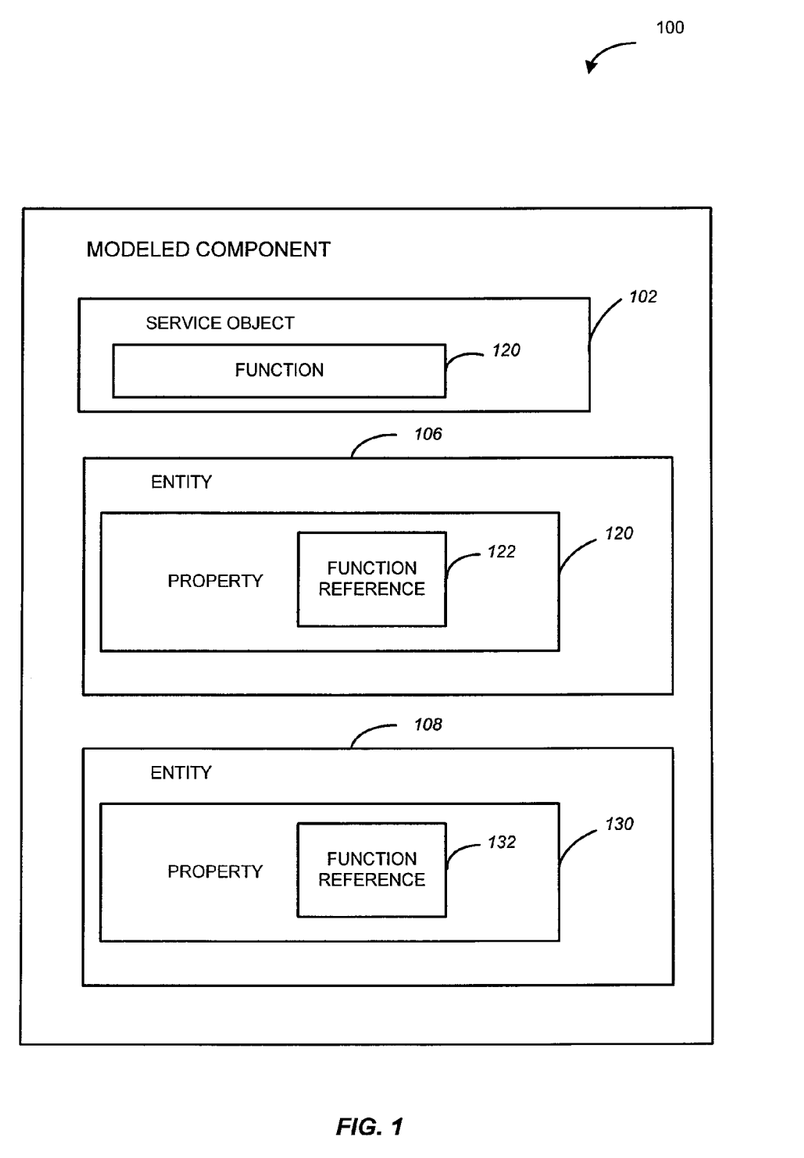
FIG. 1 is a graphical representation of a modeled component with a service component, in accordance with an example embodiment.

A graphical representation of a modeled component where a service component is specified at an entity level (as an immediate child of the model) and then used as an attribute of a property of an entity is provided in FIG. 1. As shown in FIG. 1, a modeled component 100 includes a service component 102 that is defined at a level of the model, as a direct child of the modeled component, and an entity component 106. The entity component 106 includes a property 120 that references the service defined by the service component 102, as indicated by a service reference 122. The modeled component 100 also includes an entity component 108. The entity component 108 includes a property 130 that also references the service defined by the service component 102, as indicated by a service reference 132.

Example system and method for providing one or more services in a modeled component may be described with reference to an environment illustrated in FIG. 2. The environment 200 may include an integrated development environment (IDE) 210 and a runtime application 220. Modeled components may be created in the IDE 210. The code generated by the IDE 210 is compiled and made available to a runtime application 220 a form of a consumable model. The IDE 210 and the runtime application 220 may reside at different computer systems that may communicate via a communications network (not shown). The communications network may be a public network (e.g., the Internet, a wireless network, a public switched telephone network (PSTN), etc.) or a private network (e.g., LAN, WAN, Intranet, etc.). There is no actual communication with the IDE at runtime.

Figure 2:
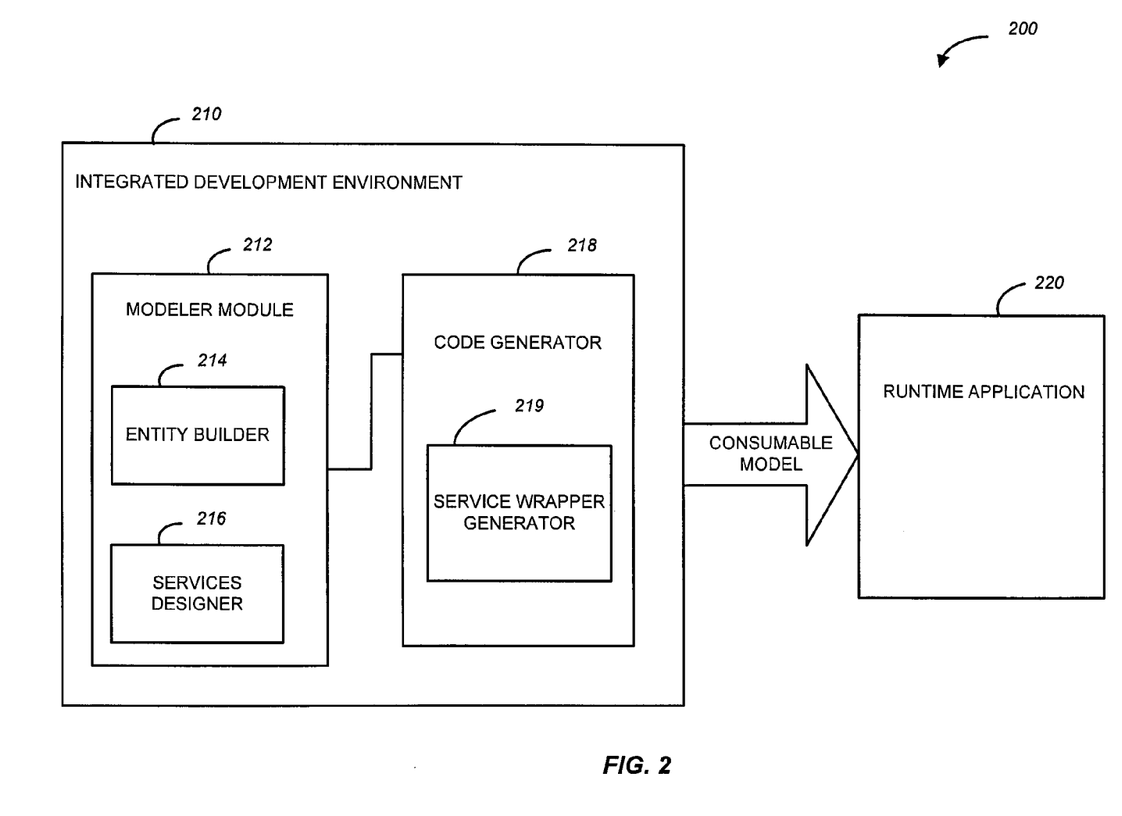
FIG. 2 is a block diagram showing an environment within which a method and system for providing one or more services in modeled components may be implemented, in accordance with an example embodiment.

As shown in FIG. 2, the IDE 210 has an associated modeler module 212 and a code generator 218. The modeler module 212 may be configured to create modeled components (or models) and may include an entity builder 214 configured for building entity components and a services designer 216 configured to create service components. A model created by the modeler module 212 is further processed by the code generator 218. The code generator 218 generates a value object (that can be consumed by a runtime application) for every entity component encountered in a model. In order to process service components that have been included in a model, the code generator 218 may include a service wrapper object generator 219. The service wrapper object generator 219 may be configured to process in-memory representation of a modeled component to create a service wrapper object that can then be used to provide a strongly typed remote service invocation utility. The processing of a model by the code generator 218 results in a consumable model that can be provided to the runtime application 220. Some examples of the IDE 210 include, e.g., Adobe® Flash® Builder™ and Adobe® LiveCycle® ES2 Workbench provided by Adobe Systems Incorporated. Some examples of the runtime application 220 include, e.g., Flash® Player provided by Adobe Systems Incorporated and the Java™ Virtual Machine. Various modules that are utilized for creating and managing modeled components may be termed a modeling system. An example modeling system may be discussed with reference to FIG. 2.

Figure 3:
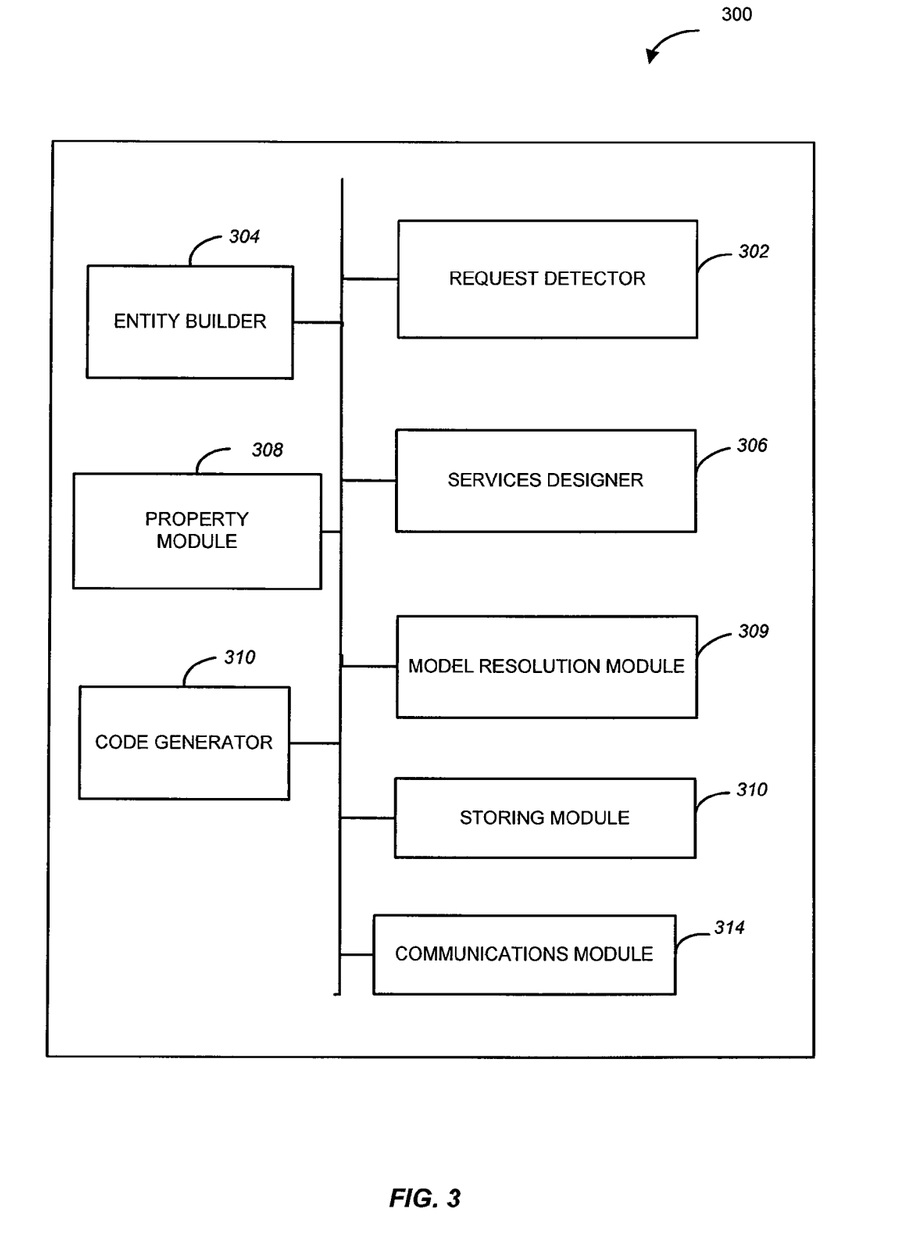
FIG. 3 is a block diagram illustrating a system for providing one or more services in modeled components, in accordance with an example embodiment.

FIG. 3 is a block diagram illustrating a system 300 for providing one or more services in modeled components, according to one example embodiment. As shown in FIG. 3, the system 300 includes a request detector 302, an entity builder 304, a services designer 306, and a property module 308. The request detector 302 may be configured to receive requests to create modeled components. Requests may be received, e.g., via a user interface provided in the context of the IDE 210 shown in FIG. 2 or from another computing application. As described above and as illustrated in FIG. 1 and FIG. 2, a modeled component comprises one or more entity components (entities) that have one or more associated properties and also may include a service component that represents a collection of one or more functions that can be called from a property of an entity in the model. A property that includes a call to a function from a service component may derive its value from the result of the execution of the function at runtime. The entity builder 304 may be configured to create entities associated with models. The services designer 306 may be configured to create service components. The services designer 306 permits specifying a service component at a model level, and a function defined in the service component in a model may be referenced from properties of multiple entities within that model. The property module 308 may be configured to associate a function from a service component with one or more properties of one or more entities. A property may derive a value based on a result of an execution of its associated function component.

The system 300 may also include a model resolution module 309, a code generator 310, a storing module 312, and a communications module 314. The model resolution module 309 may be configured to create an in-memory representation of the modeled component. The code generator 310 may be configured to generate code, based on the in-memory representation of the modeled component that can be compiled and then provided to a runtime application. The code generator 310 may include a service wrapper generator (not shown) configured to generate a service wrapper for a service component to permit remote and web invocations of functions defined in the service component. The storing module 312 may be configured to store the in-memory representation of the modeled component in a memory device. The communications module 314 may be configured to provide the modeled component to a runtime computing application (e.g., to the runtime application 320 shown in FIG. 2). The modules illustrated in FIG. 3 may be implemented as software, hardware, or a combination of both. Various operations performed by the system 300, according to an example embodiment, may be discussed with reference to FIG. 4.

Figure 4:
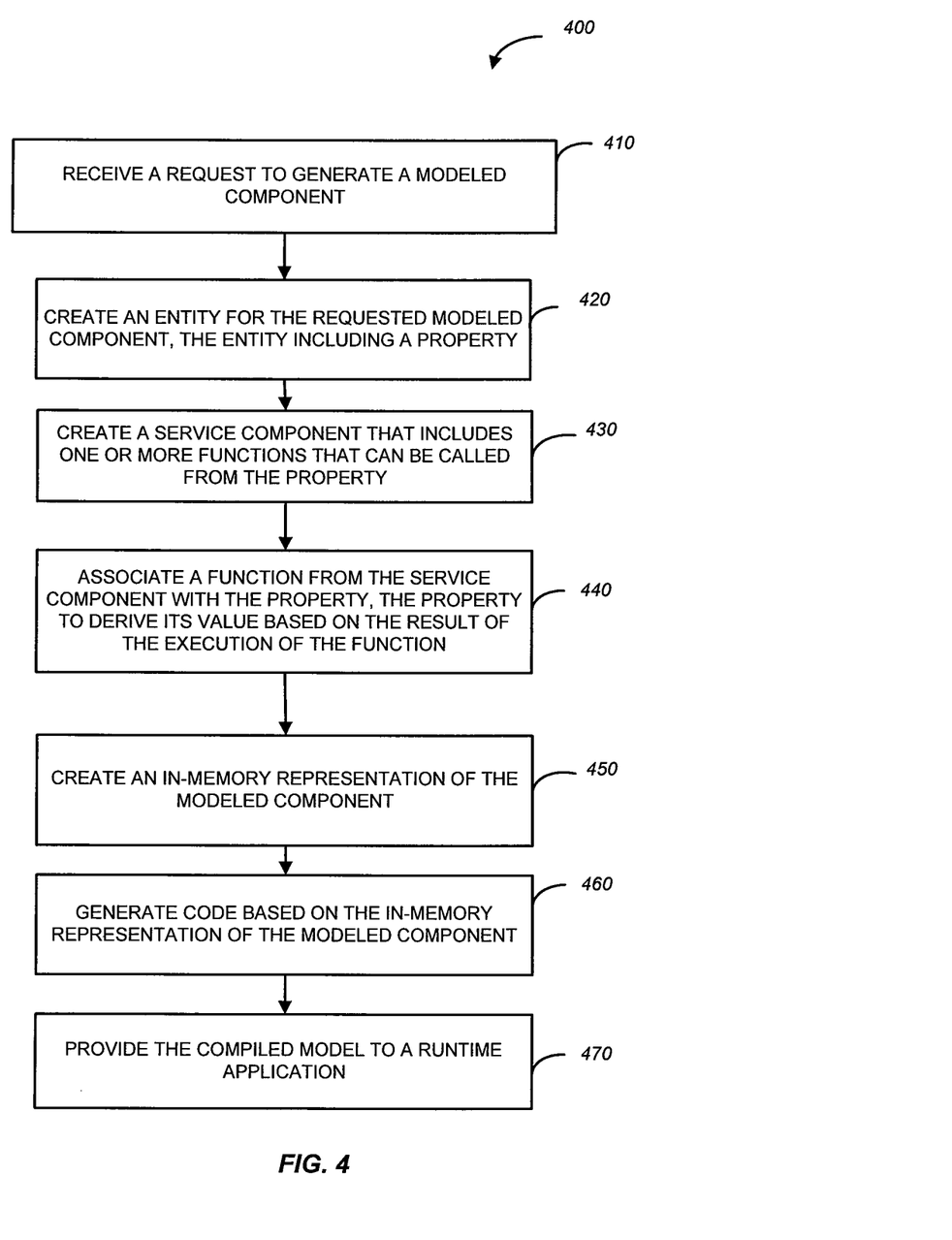
FIG. 4 is a flow chart illustrating a method for providing one or more services in modeled components, in accordance with an example embodiment.

FIG. 4 is a flow chart illustrating a method 400 for providing one or more services in modeled components, in accordance with an example embodiment. The method 400 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in any of the modules shown in FIG. 3

As shown in FIG. 4, the method 400 commences with operation 410, where the request detector 302 of FIG. 3 receives a request to create a modeled component—a model comprising an entity that has a property that includes a call to a function from a service component defined in the model. In response to the detected request, the entity builder 304 of FIG. 3 creates an entity for the requested model at operation 420. At operation 430, the services designer 306 of FIG. 3 creates a service component that includes one or more functions that can be called from a property of an entity in the model. The service component may be specified within the model at the model level. As mentioned above, a type of an input parameter of a function within the service component may be a custom type defined by another entity of the modeled component. At operation 440, a function from the service component created by the services designer 306 is associated with the property, the property to derive its value based on a result of an execution of the function. At operation 450, the model resolution module 309 of FIG. 3 creates an in-memory representation of the model. The in-memory representation of the model may be stored by the storing module 312 of FIG. 3. The code generator 310 of FIG. 3, at operation 460, uses the in-memory representation of the model to generate code (e.g., classes) that can be compiled and used at runtime to represent the modeled component in a particular runtime application. The service component defined in the model is processed by the service wrapper generator 219 of FIG. 2 to generate a service wrapper that can be used at runtime to call the function defined in the service component. At operation 470, the communications module 314 of FIG. 3 provides the compiled model to a runtime application.

An example of a model that includes two services each one of which has a different purpose is shown below in Table 3.

TABLE 3

```
<model xmlns="http://ns.adobe.com/Fiber/0.3">
    <service name="BookService">
        <annotation name="ActionScriptGeneration">
            <item name="ServiceType">RemoteObject</item>
        </annotation>
        <function name="updateBook" arguments="book:Book,
        origItem:Book, changes:string[ ]" return-type="Book"/>
        <function name="createBook" arguments="book:Book" return-
        type="string"/>
        <function name="deleteBook" arguments="id:string" return-
        type="void"/>
        <function name="getBookById" arguments="id:string" return-
        type="Book"/>
        <function name="countBooksByAuthor"
        arguments="author:MyAuthor" return-type="integer"/>
        <function name="getBooksByAuthor"
        arguments="author:MyAuthor, startIndex:integer,
        numItems:integer" return-type="Book[ ]"/>
    </service>
    <service name="AmazonAPI">
        <annotation name="ActionScriptGeneration">
            <item name="ServiceType">WebService</item>
            <item
            name="WSDL">http://www.amazon.com/fictitiousURL
            ?wsdl</item>
            <item name="WSDL-service">getBookURL</item>
        </annotation>
        <function name="getBookURL" arguments="title:string,
        author:string" return-type="string"/>
    </service>
    <entity name="Book" persistent="true">
        <id name="id" type="string"/>
        <property name="title" type="string"/>
        <property name="publicationDate" type="date"/>
        <property name="author" type="MyAuthor"/>
        <property name="amazonURL"
        expr="AmazonAPI.getBookURL(title, author.lastName)"/>
    </entity>
    <entity name="MyAuthor" persistent="true">
        <id name="id" type="integer"/>
        <property name="lastName" type="string"/>
        <property name="firstName" type="string"/>
    </entity>
</model>
```

As shown in Table 3 above, the first declared service, "BookService," is an example of the standalone service use case. An ActionScript generator (that corresponds to the service wrapper generator 219 of FIG. 2) may generate a service wrapper for this service that will enable user applications to easily communicate with a RemoteObject (the service type specified via annotation) back-end that exposes all of the functions declared in the service. As shown in Table 3, some of the functions declared within a service component either take or return complex typed arguments (e.g., "Book" and "MyAuthor"). These types are entities declared in this same model, so declaration of this service without the entity declarations would not be possible. Thus this use cases demonstrate extended usability of a modeling system to those cases where it may be advantageous to model entities and also model services that traffic those entities.

The second declared service shown in Table 3, "AmazonAPI," could also be used as a stand-alone service. In the example shown in Table 3, the function "getBookURL" declared in the "AmazonAPI" service is used in calculated (derived) property expressions. For example, the function "getBookURL" is referenced in "amazonURL" property of the "Book" entity. Whenever a "Book" value object is initialized, a WebService call is made via the service wrapper generated by the ActionScript generator based on the definition of the "AmazonAPI" service in the associated model. A Web service is a software system designed to support interoperable machine-to-machine interaction over a network. Other systems interact with the Web service in a manner prescribed by its description using SOAP-messages, typically conveyed using HTTP with an XML serialization in conjunction with other Web-related standards. The "amazonURL" property of the "Book" value object will thus always be populated with the URL determined via the service call. This use case extends the complexity of derived properties to those that involve server invocations.

As can be seen in Table 3, the "AmazonAPI" service and the "BookService" in the model both use annotations. Annotations, in one example embodiment, enable specific consumers to add domain-specific information to a model. Annotations thus may be used advantageously to associate arbitrary simple data with model definition elements. In the "BookService," the service type annotation is declared in order to identify this service to the ActionScript generator as a RemoteObject service. RemoteObject represents a remote object function invocation made by sending an encoded message to a server endpoint that is capable of interpreting this encoded message. The ActionScript generator can then leverage Flex® SDK features to create a wrapper around an SDK RemoteObject. ("SDK" stands for Software Development Kit.) End users can then configure specific connection information once the wrapper has been instantiated. In the "AmazonAPI," the annotations denote that this is a WebService, so the ActionScript generator may leverage the SDK's WebService object. In this case, all of the connection information is present so this service wrapper is ready for use and can thus be leveraged in calculated properties. Both services shown in Table 3 above leverage existing services supported by the Flex® SDK. Custom services—services where the wrapper is just a shell and the user provides the particulars of the actual function calls—may also be provided in some embodiments. It will be noted that the ActionScript generator may include support for HTTPService as well, which permits HTTP requests to be made from a Flex® application to any server endpoint capable of receiving them.

Figure 5:
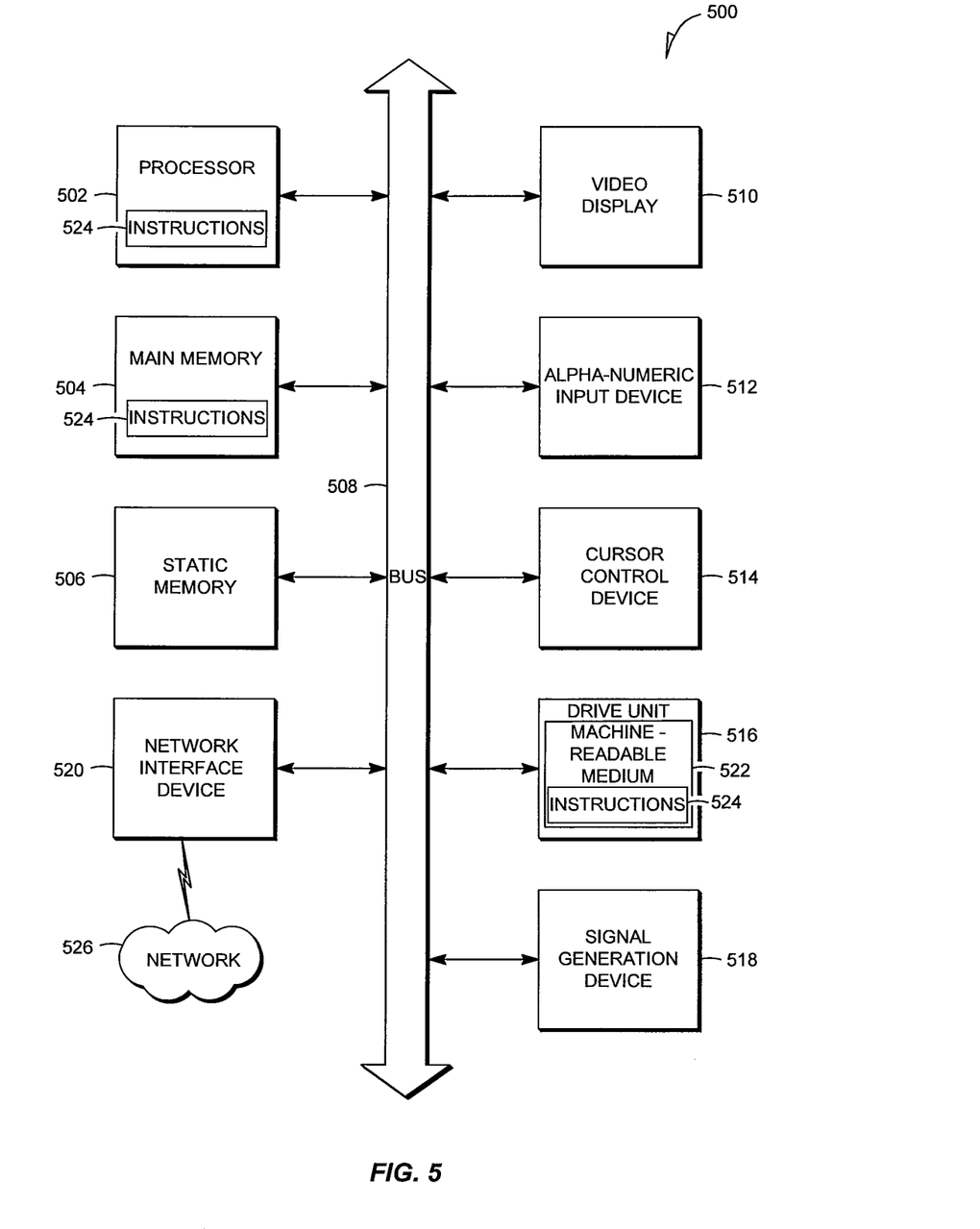
FIG. 5 is a diagrammatic representation of a machine in the example form of a computer system within which a set of instructions, for causing the machine to perform any one or more of the methodologies discussed herein, may be executed.

FIG. 5 is a diagrammatic representation of a machine in the example electronic form of a computer system 500 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) cursor control device 514 (e.g., a mouse), a disk drive unit 516, a signal generation device 518 (e.g., a speaker) and a network interface device 520.

The disk drive unit 516 includes a computer-readable (or machine-readable) medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and system for providing services in a modeled component have been described. Service components may be utilized, e.g., to define derived properties that cannot be expressed in terms of the internal entity definition state alone and may only be calculated via a remote service invocation. The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method comprising:
   receiving a request to create a modeled component, the modeled component comprising:
   an entity component, the entity component including a property, and
   a service component, the service component defining a function to be applied to the property;
   including a reference to the function from the service component with the property of the entity component, the property to derive a value based on a result of an execution of the function; and
   storing an in-memory representation of the modeled component in a memory device, the service component and the entity component defined at the same hierarchical level in the modeled component.

2. The method of claim 1, wherein an input ammeter of the function from the service component is of a type defined by an entity in the modeled component.

3. The method of claim 1, wherein the function is a strongly typed function.

4. The method of claim 1, wherein the service component includes an annotation to identify the service component as a remote object service.

5. The method of claim 1, wherein the service component includes an annotation to identify the service component as a web service.

6. The method of claim 1, comprising providing the modeled component to a runtime application.

7. The method of claim 6, wherein the runtime application is for delivering rich web content.

8. The method of claim 6, wherein the runtime application is Java Virtual Machine.

9. The method of claim 1, wherein the service component is provided at a level of the modeled component.

10. The method of claim 1, wherein the function from the service component is referenced by an associated property from a second entity in the modeled component, the associated property from the second entity to derive a value based on a result of an execution of the function the service component.

11. A computer-implemented system comprising:
    at least one processor coupled to a memory;
    a request detector to receive, using the at least one processor, a request to create a modeled component, the modeled component comprising:
    an entity component, the entity component including a property, and
    a service component, the service component defining a function to be applied to the property;
    a property component to include, using the at least one processor, a reference to the function from the service component with the property of the entity component, the property to derive a value based on a result of an execution of the function; and
    a storing module to store, using the at least one processor, an in-memory representation of the modeled component in a memory device, the service component and the entity component defined at the same hierarchical level in the modeled component.

12. The system of claim 11, wherein an input parameter of the function from the service component is of a type defined by an entity in the modeled component.

13. The system of claim 11, wherein the function is a strongly typed function.

14. The system of claim 11, wherein the service component includes an annotation to identify the service component as a remote object service.

15. The system of claim 11, wherein the service component includes an annotation to identify the service component as a web service.

16. The system of claim 11, comprising a communications module to provide the modeled component to a runtime computing application.

17. The system of claim 16, wherein the runtime application is for delivering rich web content.

18. The system of claim 16, wherein the runtime application is Java Virtual Machine.

19. The system of claim 11, wherein the service component is provided at a level of the modeled component.

20. A machine-readable non-transitory storage medium having instruction data to cause a machine to:
    create a modeled component, the modeled component comprising:
    an entity component, the entity component including a property, and
    a service component provided at a level of the modeled component, the service component defining a function to be applied to the property;
    include a reference to the function from the service component with the property of the entity component, the property to derive a value based on a result of an execution of the function; and
    store an in-memory representation of the modeled component in a memory device, the service component and the entity component defined at the same hierarchical level in the modeled component.

* * * * *